Oct. 22, 1963  A. A. SUNDBERG  3,108,219
PHASE SHIFTING BRIDGE APPARATUS
Filed Nov. 18, 1959  3 Sheets-Sheet 1

INVENTOR.
ALFRED A. SUNDBERG
BY Charles J. E. Vorth
AGENT

INVENTOR.
ALFRED A. SUNDBERG

INVENTOR.
ALFRED A. SUNDBERG
BY Charles J. Worth
AGENT

United States Patent Office 3,108,219
Patented Oct. 22, 1963

3,108,219
PHASE SHIFTING BRIDGE APPARATUS
Alfred A. Sundberg, Dumont, N.J., assignor to The Bendix Corporation, a corporation of Delaware
Filed Nov. 18, 1959, Ser. No. 853,971
5 Claims. (Cl. 323—123)

This invention relates to apparatus adapted to shift the phase angle of a reference voltage and more specifically to precision apparatus of this type having means for indicating the phase angle shift.

An object of this invention is to provide precision apparatus for shifting the phase angle of a reference voltage through 360° and including means for indicating such a phase shift.

Another object of this invention is to provide precision apparatus being self-calibrating to a zero set and having electrical networks for shifting the phase angle of a reference voltage through 360°, this apparatus including means for direct reading of such a phase shift.

Still another object of this invention is to provide precision test apparatus capable of shifting the phase angle of a reference voltage and providing direct reading indications of such a phase angle shift for determining the phase angle of a voltage having an unknown phase angle.

And still another object of this invention is to provide precision apparatus for inclusion in a system requiring a calibrated phase angle change between the components thereof.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of the invention.

Figure 1:
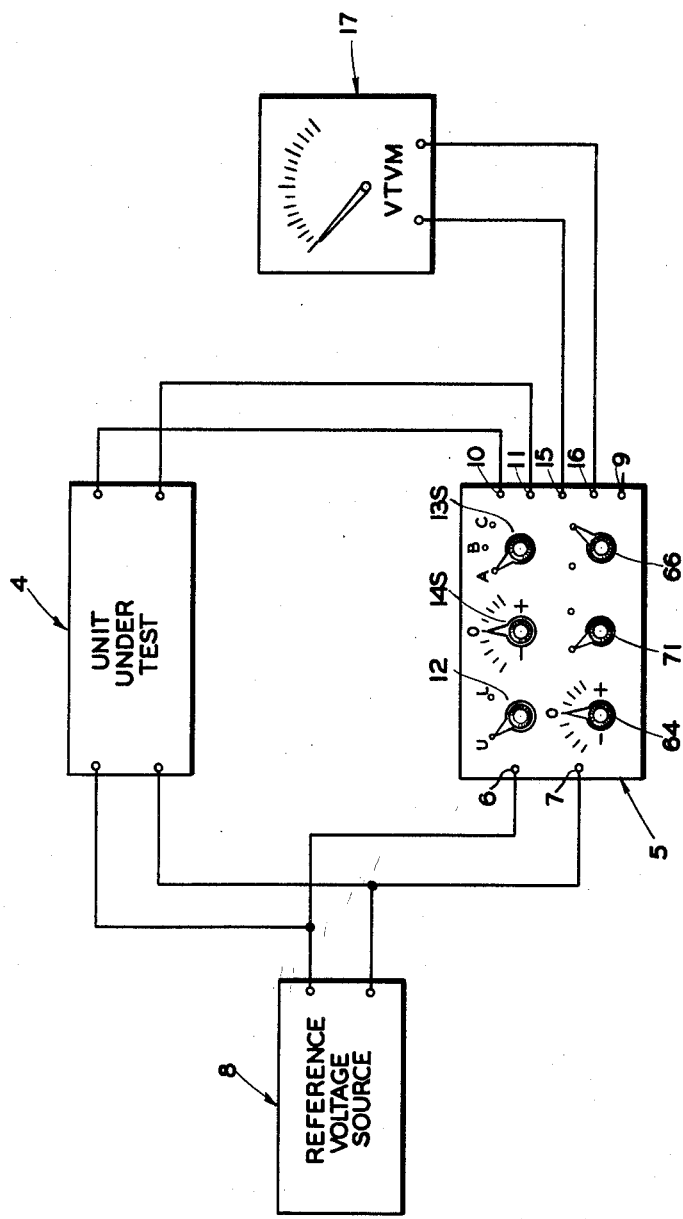
Figure 2:
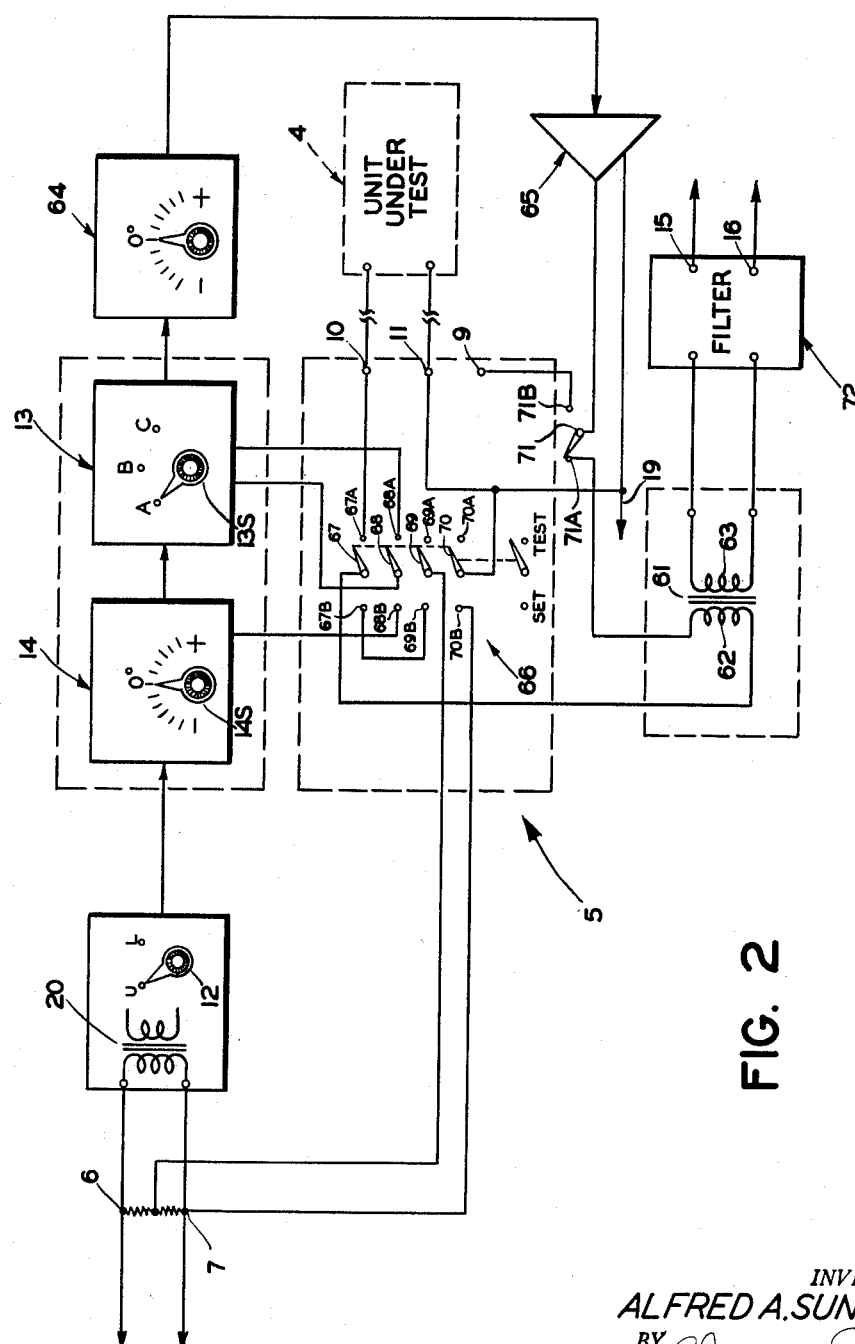
Figure 3:
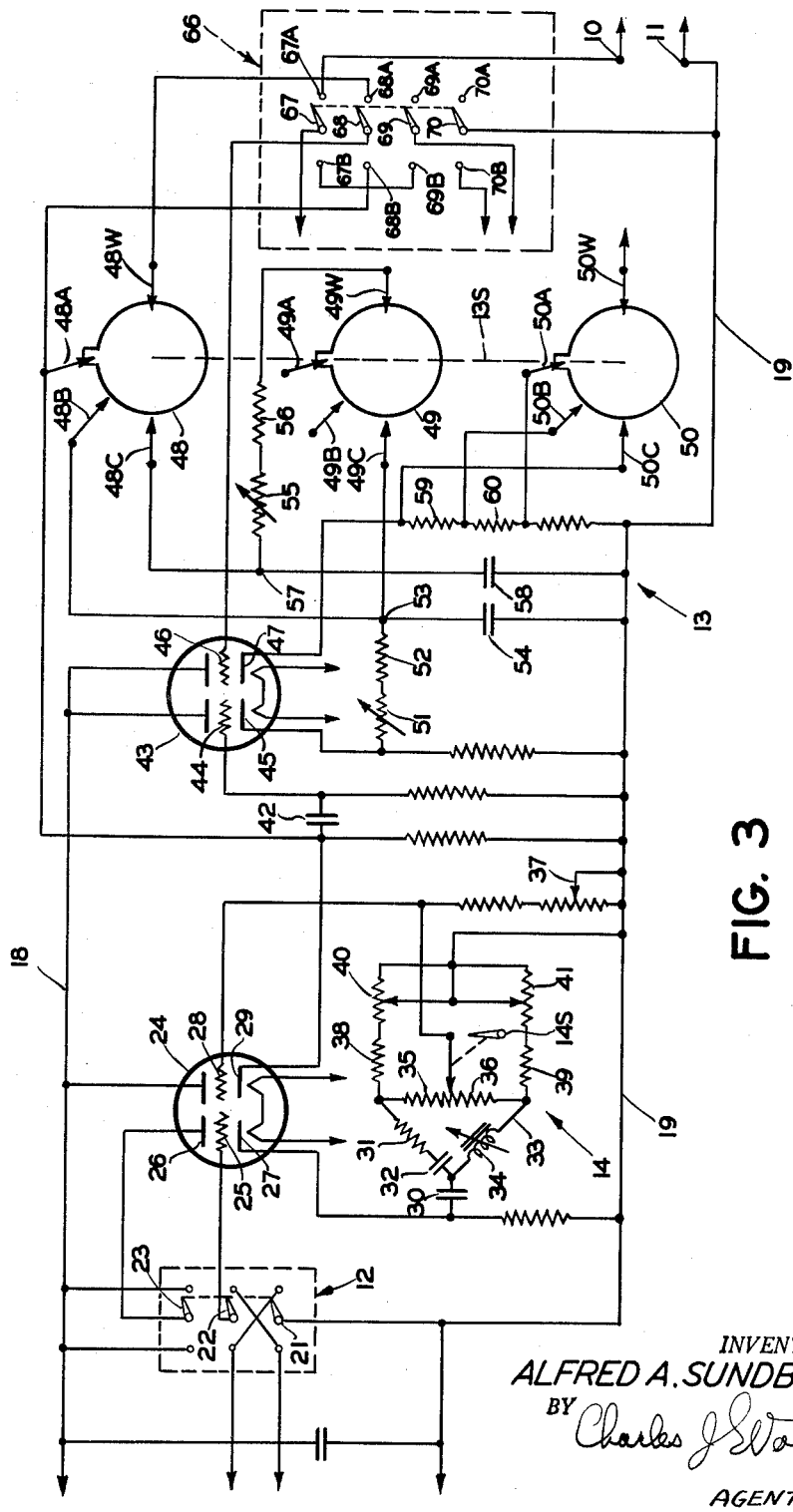

FIGURE 1 is a block diagram of an arrangement for determining the phase angle shift between an input and the output voltages of a unit under test in which apparatus constructed in accordance with this invention is utilized, FIGURE 2 is a schematic diagram of the apparatus constructed in accordance with this invention and included in the test arrangement of FIGURE 1, and, FIGURE 3 is a circuit diagram of the phase angle shifting networks of the apparatus of FIGURE 2.

Referring now to the drawings, the apparatus 5 which we shall call a phase angle indicator receives a reference voltage $E_r$, having a zero phase angle, at its terminals 6 and 7 from a source 8. The reference voltage $E_r$ is also received by a unit 4, under test, and undergoes a phase angle shift between the input and output terminals thereof. The output voltage $E_\theta$ from the unit 4 has an unknown phase angle $\theta$ and is directed to the terminals 10 and 11 of the phase angle indicator 5; then to a bucking circuit as will be further described.

The terminals 6 and 7 of the phase angle indicator 5 are also connected to the bucking circuit through a phase reversing or range switch 12, a phase angle band establishing network 13 and a vernier type phase angle shifting bridge network 14. The switch 12 includes an indicating arm and indicia as does the mechanical operating connection 14S provided to adjust the bridge network 14. Included in the network 13 is a multi-wafer switch 13S which has an indicating arm and indicia for identifying the phase angle band established by the network. The bucking circuit compares the reference voltage $E_r$ received by the phase angle indicator 5 to the output voltage $E_\theta$ from the unit 4 under test. The output of the bucking circuit is connected through the terminals 15 and 16 to a signal responsive unit 17 which may be a VTVM as is shown in the drawings. When the indicator arm of the meter 17 reaches an elevated position, by varying the position of the switch 12 and/or the conditions of the networks 13 and/or 14, the phase angle of the reference voltage $E_r$ from the terminals 6 and 7 may be shifted until the reference voltage phase angle equals the unknown phase angle of the output voltage $E_0 \pm 180°$ at the bucking circuit. When the phase shift of the reference voltage satisfies this condition, the indicator arm of the VTVM 17 will approach the zero indication and by reading the phase shift from the indicia associated with the switch 12, the operating mechanism 13S and the switch 14S, the amount of phase angle shift in the unit 4 under test will be shown. This is true since the phase angle of the voltage $E_0$ and the shifted phase angle of the reference voltage $E_{r\theta}$ ($0 \pm 180°$) are equal in amplitude and exactly $180°$ opposite in phase angle to provide a null in the bucking circuit and thus no signal is applied to the VTVM 17.

The signal responsive indicating means 17 is not limited to a VTVM type indicator, and a resolution type unit such as an oscilloscope may be used (not shown). In this modified arrangement the terminals 9 and 11 of the apparatus 5 are now connected to one side of the oscilloscope while the output voltage $E_0$ from the unit 4 is connected to the opposite terminals of the scope. The same switches and networks are again required to shift the phase angle of the reference voltage $E_r$ until a null indication is present on the scope. In this arrangement, the bucking circuit is disconnected by a "bucking-no bucking" switch 71, and the reference voltage is connected directly to the oscilloscope by terminals 9 and 11. As may be seen with one type of instrument such as the VTVM, the comparison between the phase angles of the two voltages is accomplished within the bucking circuit of the phase angle indicator 5. With the second type unit or oscilloscope, the comparison is accomplished within the final signal responsive indicating means.

Still another environment for the novel phase angle indicator 5 is in a system in which a component or components require a voltage out of phase with the remainder of the system (not shown). For this requirement, the same as when an oscilloscope is used, the system voltage $E_r$, having a zero phase angle, is connected to the terminals 6 and 7 while the components requiring a voltage shifted in phase are connected to the terminals 9 and 11. By adjusting the various controls of the phase angle indicator 5, a phase shift of the system voltage is accomplished. Since this apparatus is of the precision type, an accurate displacement of the phase angle may be provided.

The terminals 6 and 7 connected to the reference voltage source 8 are also connected to a three-pole double throw phase angle reversing or range switch 12 through a coupling transformer 20. The first two contacts arms 21 and 22 of the switch 12 alternately connect the ends of the secondary coil of the transformer 20 to the ground line 19 and to the grid 25 of a cathode follower tube 24. The cathode follower tubes 24 and 43 (to be described) are primarily included as isolation means between the networks 12, 14, 13 and have a high impedance input and a low impedance output. The third contact arm 23 of the switch 12 merely makes and breaks a connection from the plate power (B+) line 18 to the plate 26 of the tube 24. The cathode 27 of the tube 24 is connected to a variable lead/lag bridge network 14 through a coupling capacitor 30.

The variable lead/lag bridge network 14 has a first arm 31 with a capacitor 32 and a second arm 33 with an inductor 34. A resistor 35 being a potentiometer winding connects the ends of the arms 31 and 33 and has a wiper 36 which is connected to the grid 28 of the cathode follower tube 24. The other two arms 38 and 39 of the bridge network 14 include variable resistance elements 40 and 41, respectively, which are required to calibrate maximum lead and lag values when setting or calibrating the potentiometer 35, 36. As is shown in FIGURE 3, the wiper 36 is in a balanced or center position and no shift of the reference voltage phase angle will occur. However, as the mechanical operator 14S is moved, the wiper 36 travels towards one of the terminal positions to shift the phase angle an amount proportionate to its movement. To help calibrate the potentiometer to provide a linear function, a second potentiometer 37 is required. The positions of the legs and components may be varied to provide a lead/lag bridge network without departing from the concepts of this invention as long as the amplitude of the voltages across the adjacent legs between the two circuits are equal. The cathode 29 of the cathode follower tube 24 is connected to the grid 44 of a second cathode follower tube 43 through a coupling capacitor 42, and also to the contact 48A in the switch 13S as will be further explained.

In the apparatus as shown, an arbitrary phase angle shift band of a 60° increment is provided by the band network 13 and the bridge network 14 provides for a vernier linear shift of the phase angle within the provided band of ±30°. To eliminate multiplicity of circuitry in the band establishing network 13, the phase angle reversing or range switch 12 has been incorporated to permit the use of each of the three switch positions of the switch 13S in a high or a low range. As can be readily visualized, if the phase angle shift bands were of smaller increments, using the same potentiometer for varying phase angle shift within such bands, a more precise resolution of the phase angle shift may be obtained.

The band switch 13S is comprised of three wafer rotors 48, 49 and 50, having wipers 48W, 49W and 50W respectively. Each of the rotors have a set of three contacts corresponding to the three positions, A, B and C of the switch 13S, these contacts being numbered with the numeral of the associated wafer and having a letter suffix to denote the switch position. As previously mentioned, the contact 48A is connected to the cathode 29 of the cathode follower tube 24. The contact 48B is connected to the cathode 45 of the cathode follower tube 43 through a variable resistor 51 and a fixed resistor 52, and, is also connected to the ground line 19 through a junction 53 and a capacitor 54. The contact 48C is connected to the wiper 49W through a variable resistor 55 and a fixed resistor 56, and is further connected to the ground line 19 through a junction 57 and a capacitor 58. The variable resistors 51 and 55 are required to initially adjust the circuit and act as fixed resistors during operation. The contacts 49A and 49B are not used while the contact 49C connects to the junction 53. The cathode 47 of the cathode follower tube 43 is connected to each of the contacts 50A, 50B and 50C, and also to the ground line 19. Between the taps for the contacts 50B and 50C is a resistor 59 while between the taps for the contacts 50B and 50A is a resistor 60. A similar resistor is provided between the tap for the contact 50A and the ground line 19. The contacts 50A, 50B and 50C are connected to cathode 47 in reverse order to their positions in the switch 13S. These resistors are incorporated in the circuit to compensate for the loss in gain to the amplifier 65 and the "zero set compensator" 64 to which the cathode 47 is connected by one of the contacts 50A, 50B or 50C, and the wafer rotor 50 and the associated wiper 50W. The high side of the amplifier 65 may be connected to one end of the primary coil 62 of the transformer 61 by the switch 71 and contact 71A when a VTVM type indicator is used. However, when the apparatus 5 is to be incorporated in a test arrangement including an oscilloscope or similar equipment, or, in a system requiring a voltage out of phase with the system voltage, the switch 71 with the contact 71B connects the high side of the amplifier 65 to the termianl 9.

A four-pole double throw switch 66 is used as a "test-zero set" switch and simultaneously provides connections to the grid 46 of the cathode follower tube 43. The switch 66 has a first arm 67 connected to the end of the primary coil 62 of the transformer 61, and has a contact 67A connected to the terminal 10. A second contact 67B is connected to the contact 69B of the switch 66. A second arm 68 is connected to the grid 46 of the cathode follower tube 43, has a contact 68A connected to the wiper 48W and a second contact 68B connected to the contact 48A of the switch 13S. A third arm 69 is connected to the terminal 6, the contact 69A being unconnected and the contact 69B being connected to the contact 67B. The fourth arm 70 of the switch 66 is connected to the terminal 11, the contact 70A being unconnected and the contact 70B being connected only to the terminal 7.

With the switch 66 in the "test" or operative position for use with a VTVM type signal indicator, the various arms engage the associated A contacts. The switch arm 67 and contact 67A connect the high side of the unit 4, under test, from the terminal 10 to the opposite end of the primary winding 62 of the transformer 61, from that connection from the wiper 50W. The low side of the unit 4 is connected to the ground line 19 as is the low side of the amplifier 65, as may be clearly seen in FIGURE 2. The secondary coil 63 of the transformer 61 is connected to the terminals 15 and 16 through a filter 72 which is used to eliminate distortion and noise. When the switch 13S is in the A position, with the bridge network 14 in the zero position, there is no phase angle band shift and the grid 46 of the cathode follower tube 43 is connected to the cathode 29 of the cathode follower tube 24 through the contact 48A, the wafer rotor 48, the wiper 48W, the contact 68A and the contact arm 68. The cathode 47 is connected to the wiper 50W which is further connected to the primary coil 62 of the transformer 61, in the manner previously described, through resistors 59 and 60, the contact 50A and the wafer rotor 50. To obtain a 60° band shift of the phase angle, the switch 13S is moved to position B which now connects the grid 46 to the cathode 45 of the cathode follower tube 43 through the path including the resistors 51 and 52 to the contact 48B, the wafer rotor 48, the wiper 48W, the contact 68A, and the arm 68. Simultaneously, the cathode 47 is connected to the wiper 50W through the resistor 59, the contact 50B and the wafer rotor 50. To increase the phase angle band shift to 120°, the switch 13S is now moved to position C. While the grid 47 is again connected to the cathode 45, but in this instance, the resistors 55 and 56 are put into series with the resistors 51 and 52 in the following manner. The cathode 45 is now connected to the wiper 49W through the resistors 51 and 52, the junction 53, the contact 49C and the wafer rotor 49. The wiper 49W, in turn, is connected to the wiper 48W through the resistors 55 and 56, the contact 48C and the wafer rotor 48. The wiper 48W is connected through the contact 68A and the contact arm 68 to the grid 46. Simultaneously, the cathode 47 is connected to the wiper 50W merely through the contact 50C and the wafer rotor 50 thereby eliminating the resistors 59 and 60 from the circuit in use.

When the phase angle indicator 5 is to be incorporated in a test arrangement having a resolving type signal indicator as an oscilloscope, or, in a system requiring a voltage out of phase with the system voltage, the "buck-no buck" switch 71 is put in the B position thus disconnecting the amplifier 65 from the transformer 61. The high side of the amplifier 65 is now connected to the terminal 9 through the switch 71. The "test-zero set" switch 66 remains in the "test" position and the switch 12 together with the networks 13 and 14 are used to shift the phase of the reference voltage as may be required.

When it is desired to "zero set" this apparatus the switch 66 is put on the "zero set" position wherein the various arms engage the associated B contacts. The potentiometer wiper 36 is put to its center or zero shift position by the mechanical control 14S and the switch 13S may be in any position. The position of the switch 13S is not critical when the switch 66 is in the "zero set" position because the arm 68 and the contact 68B connects the cathode 29 of the cathode follower tube 24 to the grid 46 of the cathode follower tube 43 which parallels the circuitry when the switch 13S is in the A or no band shift position. The switch 66 being in the "zero set" position, the terminal 10 is disconnected from the primary coil 62 of the transformer 61 and connection is made between that coil and the terminal 6 through the arm 69, the contacts 69B and 67B and the contact arm 67. Simultaneously, the terminal 7 is connected to the ground line 19 through the arm 70 and its associated contact 70B. As can be readily seen, movement of the switch 66 to the zero set position by-passes the band network 13 and merely establishes the connections between the input terminals 6 and 7 and the transformer 61, replacing the connection from the terminals 10 and 11 receiving the output voltage from the unit 4, under test. The reference voltage at the input terminals is now compared with the reference voltage after it has passed through various shift networks. Should there be a small signal from the bucking circuit or transformer 61, it would indicate a minor alignment error in one of the networks 13 or 14, or, the amplifier 65 which may be compensated for with the "zero set" control 64. The control 64 may be a potentiometer adjustable lead/lag network having a phase angle shift indicator and capable of shifting the phase angle of the voltage from the cathode 47 a minimal amount for alignment purposes only. While several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

I claim:

1. A bridge network for shifting the phase angle of a reference voltage, comprising an input to receive the voltage, two circuits each being connected to the input including two arms connected to one another and to the adjacent arm of the other circuit, each of said arms having a voltage of an amplitude equal to the amplitude of the voltage of the adjacent arm in the other circuit, means to produce a leading phase in one of said circuits and a lagging phase in the other circuit, a resistor connected to the circuits at the connections of the arms of said two circuits only, a wiper in contact with said resistor and moveable along its length to pick the shift of such phase angle, and resistance means connected to the wiper to calibrate the resistor and arranged to produce linear phase shift according to wiper movement.

2. The bridge network claimed in claim 1, and a variable resistor in each of said two circuits to control the maximum resistance of said resistor connected to the arm connections.

3. A bridge network for shifting the phase angle of a voltage, comprising four arms with one arm having means to provide a leading phase angle shift and another arm having means to provide a lagging phase angle shift, resistance means connected to the bridge only at points across the bridge to avoid affecting the phase angle of the voltage in the arms of the bridge, and a wiper movable along the resistance means and providing a voltage having a phase angle corresponding to the position of the wiper on the resistance means.

4. A bridge network as described in claim 3 having means in the arms of the bridge for balancing the phase of the voltage in each arm of the bridge.

5. A bridge network for shifting the phase angle of a voltage, comprising four arms with one arm having means to provide a leading phase angle shift and another arm having means to provide a lagging phase angle shift and the other two arms having resistors, resistance means connected to the bridge only at points across the bridge to avoid affecting the phase angle of the voltage in the arms of the bridge, and a wiper movable along the resistance means and providing a voltage having a phase angle corresponding to the position of the wiper on the resistance means.

References Cited in the file of this patent

UNITED STATES PATENTS

| | | |
|---|---|---|
| 2,143,094 | Swift | Jan. 10, 1939 |
| 2,229,450 | Garman | Jan. 21, 1941 |
| 2,264,333 | Satterlee | Dec. 2, 1941 |
| 2,351,548 | Schwartz et al. | June 13, 1944 |
| 2,410,721 | Dome | Nov. 5, 1946 |
| 2,411,423 | Guptill | Nov. 19, 1946 |
| 2,450,930 | Baclawski | Oct. 12, 1948 |
| 2,471,105 | Gustafsson et al. | May 24, 1949 |
| 2,523,167 | Undy | Sept. 19, 1950 |
| 2,685,063 | Alsberg | July 27, 1954 |
| 2,702,365 | Hyman | Feb. 15, 1955 |
| 2,749,516 | Ragazzini et al. | June 5, 1956 |
| 2,778,988 | Pihl | Jan. 22, 1957 |
| 2,902,644 | McDonald | Sept. 1, 1959 |
| 2,986,696 | Seay | May 30, 1961 |
| 3,017,574 | Redfern et al. | Jan. 16, 1962 |

FOREIGN PATENTS

| | | |
|---|---|---|
| 653,212 | Germany | Nov. 18, 1937 |

OTHER REFERENCES

A Primary Phase Standard Assembly, article in the Laboratory Report, Technology Instrument Corp. 531 Main St., Acton, Mass., publication, July 28, 1952, pages 19–22.

A Simple Variable Frequency Phase Measuring Device, article in Electrical Engineering, September 1952; pages 402–403.